(12) United States Patent
Adjorlolo et al.

(10) Patent No.: US 12,350,892 B2
(45) Date of Patent: *Jul. 8, 2025

(54) CO-CURED UV/VISIBLE LIGHT-RESISTANT FIBERGLASS COATED COMPOSITE MATERIAL FOR AIRCRAFT FUSELAGE ASSEMBLY

(71) Applicant: The Boeing Company, Chicago, IL (US)

(72) Inventors: Alain A. Adjorlolo, Shoreline, WA (US); Patrice K. Ackerman, Kent, WA (US); Jason A. Bolles, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/708,404

(22) Filed: Mar. 30, 2022

(65) Prior Publication Data

US 2023/0311427 A1 Oct. 5, 2023

(51) Int. Cl.
B29C 70/06 (2006.01)
B29C 70/28 (2006.01)
(Continued)

(52) U.S. Cl.
CPC .............. B29C 70/06 (2013.01); B29C 70/28 (2013.01); B64C 1/00 (2013.01); *B29K 2063/00* (2013.01);
(Continued)

(58) Field of Classification Search
CPC ......... B32B 37/06; B32B 5/022; B32B 7/027; B32B 7/08; B32B 27/12; B32B 27/20; B32B 27/38; B32B 2250/02; B32B 2255/02; B32B 2260/021; B32B 2260/046; B32B 2262/106; B32B 2305/08; B32B 2307/42; B32B 2307/71; B32B 2307/732; B32B 2309/02; B32B 2605/00; B29C 70/06; B29L 2031/3082; B64C 1/00

See application file for complete search history.

(56) References Cited

U.S. PATENT DOCUMENTS 7,070,850 B2   7/2006  Dietz et al.
7,323,248 B2   1/2008  Ramsey
(Continued)

FOREIGN PATENT DOCUMENTS

CN   1191926 C      3/2005
CN   106221533 A   12/2016
(Continued)

OTHER PUBLICATIONS

EP Search Report mailed Nov. 8, 2023 in re EP App No. 23186786.2.
(Continued)

*Primary Examiner* — Jeremy R Pierce
(74) *Attorney, Agent, or Firm* — COATS & BENNETT, PLLC

(57) ABSTRACT

Co-curable and co-cured UV/visible light-resistant fiberglass-coated UV/visible light composite structural material substrates, and aircraft fuselages comprising co-cured UV/visible light-resistant fiberglass-coated composite material substrates and methods of their manufacture are disclosed.

15 Claims, 3 Drawing Sheets

(51) Int. Cl.
*B64C 1/00* (2006.01)
*B29K 63/00* (2006.01)
*B29K 309/08* (2006.01)
*B29L 31/30* (2006.01)

(52) U.S. Cl.
CPC .......... *B29K 2309/08* (2013.01); *B29K 2995/0018* (2013.01); *B29L 2031/3082* (2013.01); *B64C 2001/0072* (2013.01)

(56) References Cited

U.S. PATENT DOCUMENTS

| | | | |
|---|---|---|---|
| 8,158,245 | B2 | 4/2012 | Pratte et al. |
| 8,178,606 | B2 | 5/2012 | Sang et al. |
| 8,685,544 | B2 | 4/2014 | Larson-Smith et al. |
| 8,947,847 | B2 | 2/2015 | Langone et al. |
| 9,676,961 | B2 | 6/2017 | Sang et al. |
| 9,802,714 | B2 | 10/2017 | Gerken et al. |
| 9,912,137 | B2 | 3/2018 | Le et al. |
| 10,525,667 | B2 | 1/2020 | Hebert et al. |
| 10,906,211 | B2 | 2/2021 | Sang et al. |
| 11,752,708 | B2 | 9/2023 | Ackerman et al. |
| 2010/0151186 | A1 | 6/2010 | Hebert |
| 2012/0145319 | A1 | 6/2012 | Schaaf et al. |
| 2014/0141242 | A1 | 5/2014 | Phillips et al. |
| 2017/0043529 | A1* | 2/2017 | Sanderson ......... G05B 19/4099 |
| 2019/0210338 | A1 | 7/2019 | Childers et al. |
| 2019/0233946 | A1 | 8/2019 | Bruton et al. |
| 2020/0070998 | A1 | 3/2020 | Ayyadurai et al. |
| 2020/0165005 | A1 | 5/2020 | Christy et al. |
| 2020/0316823 | A1 | 10/2020 | Sang et al. |
| 2021/0008855 | A1 | 1/2021 | Sang et al. |
| 2021/0016319 | A1 | 1/2021 | Brie et al. |
| 2021/0016553 | A1 | 1/2021 | Brei et al. |
| 2021/0031942 | A1 | 2/2021 | Brei et al. |
| 2021/0060607 | A1 | 3/2021 | Brei et al. |
| 2021/0122891 | A1 | 4/2021 | Zhu et al. |
| 2021/0367416 | A1 | 11/2021 | Hebert |
| 2023/0080641 | A1 | 3/2023 | Ackerman et al. |

FOREIGN PATENT DOCUMENTS

| | | |
|---|---|---|
| CN | 106366996 A | 2/2017 |
| EP | 3397556 A1 | 11/2018 |
| EP | 3036049 B1 | 5/2019 |
| EP | 3766683 A1 | 1/2021 |
| IN | 201911023774 A | 12/2020 |
| JP | 2012240610 A | 12/2012 |
| WO | 2021003047 A1 | 1/2021 |
| WO | 2021037889 A1 | 3/2021 |

OTHER PUBLICATIONS

Bedel, V., et al., "Innovative conductive polymer composite coating for aircrafts lightning strike protection", Journal of Applied Polymer Science, Nov. 15, 2019, pp. 1-13, vol. 137, issue No. 20.

Guo, Y., et al., "Implementation of fiberglass in carbon fiber composites as an isolation layer that enhances lightning strike protection", Composites Science and Technology, Feb. 23, 2019, pp. 117-124, vol. 174.

EP Search Report mailed Aug. 23, 2023 in re EP Application No. 22212766.4.

EP Search Report mailed Aug. 25, 2023 in re EP Application No. 22212768.0.

EP Search Report mailed Aug. 25, 2023 in re EP Application No. 22212773.0.

EP Search Report mailed Sep. 23, 2024 in re EP Application No. 24165716.2.

* cited by examiner

CO-CURED UV/VISIBLE LIGHT-RESISTANT FIBERGLASS COATED COMPOSITE MATERIAL FOR AIRCRAFT FUSELAGE ASSEMBLY

TECHNOLOGICAL FIELD

The present disclosure relates generally to the field of composite materials, and composite materials used for manufacturing large structural components. More specifically, the present disclosure relates to the field of composite materials used for structural materials for interior and exterior surfaces of large structural aircraft components.

BACKGROUND

The use of composite materials in the manufacture of various structural component parts continues to increase. At least due to the strength-to-weight ratios, composite materials offer advantages as replacements for denser materials, such as, for example, metals, metal alloys, etc., where the overall weight of a completed structure (or the weight of a component part of a completed structure) is an important consideration in the selection of materials used in the manufacture of such a completed structure, or in the manufacture of a component of a completed structure.

The use of composite materials in the manufacture of various structural component parts continues to increase. At least due to the strength-to-weight ratios, composite materials offer advantages as replacements for denser materials, such as, for example, metals, metal alloys, etc., where the overall weight of a completed structure (or the weight of a component part of a completed structure) is an important consideration in the selection of materials used in the manufacture of such a completed structure, or in the manufacture of a component of a completed structure.

Coating layers applied to composite materials are not as durable as, or have the longevity of, the composite materials to which such coating layers are applied. Composite material assemblies may otherwise comprise external or internal layers that can include, for example, protective coatings or other coating layers. For example, when composite materials are used in the fabrication of vehicles including, for example, aircraft, exterior paint coatings, referred to as an aircraft "livery", may require alteration, rework, change of logo, design, color scheme, etc., over the useful life of the vehicle. Such livery alteration, for example, may include the removal of one or more decorative coating layers applied onto a composite material, including, for example, one or more paint layers. However, the removal of one layer or layer type (paint, primer, adhesion promoting layer, adhesive layer, etc.) from materials stacked onto a composite material can require the removal of additional layers or layer types that then must be built back up, or otherwise reconstituted. In addition, livery alteration requiring paint removal via use of paint removal techniques can damage underlying layers, or even damage composite materials, if the composite materials are exposed to excessive mechanical paint removal techniques.

Unless explicitly identified as such, no statement herein is admitted as prior art merely by its inclusion in the Technological Field and/or Background section.

SUMMARY

Present aspects disclose co-curable and co-cured composite materials comprising a co-curable or co-cured layer of UV/visible light-resistant fiberglass immediately contacting the co-curable or co-cured composite structural material substrate. The incorporation into the co-cured/cu-curable composite structural material substrate of the co-cured/co-curable UV/visible light-resistant fiberglass layer can, for example, significantly impact composite material manufacture and improve the performance and reduce the weight of the composite structural material by at least obviating the need to include separate UV/visible light-resistant coatings formerly applied to composite material substrates, such as in the preparation of a composite material system used in structural assemblies for larger components, including internal and exterior surfaces of vehicles, including, for example, aircraft.

According to present aspect, a co-curable composite material fuselage assembly is disclosed, with the co-curable composite material fuselage assembly comprising a co-curable composite material substrate, with the co-curable composite material substrate comprising a co-curable composite material substrate first side and a co-curable composite material substrate second side. As disclosed, a co-curable composite material fuselage assembly further comprises a co-curable UV/visible light-resistant fiberglass-containing layer, with the co-curable UV/visible light-resistant fiberglass-containing layer comprising a co-curable UV/visible light-resistant fiberglass layer first side and a co-curable UV/visible light-resistant fiberglass layer second side, wherein the co-curable UV/visible light-resistant fiberglass-containing layer has a UV/visible light transmittance value of 0% to about 20% for UV/visible light wavelengths ranging from about 200 nm to about 800 nm when the co-curable UV/visible light-resistant fiberglass-containing layer comprises an average thickness ranging from about 2 mils to about 6 mils, and wherein the co-curable composite material (that can be, for example a co-curable epoxy resin-based composite material substrate and can further be a co-curable carbon fiber reinforced polymer composite material, etc.) in combination with the co-curable UV/visible light-resistant fiberglass-containing layer is configured to form a co-cured composite material fuselage assembly that can be a co-cured UV/visible light-resistant fiberglass layer-containing composite material fuselage assembly In another aspect, the co-curable composite material substrate is co-curable with the co-curable UV/visible light-resistant fiberglass layer at a temperature ranging from about 250° F. to about 370° F.

In a further aspect, the co-curable composite material substrate comprises a fiber reinforced epoxy resin-based matrix.

In another aspect, the co-curable composite material substrate comprises at least one of carbon fibers, boron fibers, aramid fibers, fiberglass fibers, polyester fibers, and combinations thereof.

In another aspect, the co-curable composite material substrate comprises a carbon fiber reinforced polymer.

In another aspect, the co-curable composite material substrate comprises a plurality of carbon fiber reinforced polymer prepregs.

In a further aspect, the co-curable composite material substrate second side is in direct contact with the co-curable UV/visible light-resistant fiberglass layer first side, and wherein the co-curable UV/visible light-resistant fiberglass layer completely covers the co-curable composite material substrate second side.

In another aspect, the co-curable composite material substrate comprises an outer mold line.

In another aspect, the co-curable composite material substrate is configured to form an aircraft fuselage assembly exterior, or outer surface.

In a further aspect, the co-curable composite material substrate comprises an inner mold line.

In another aspect, the co-curable composite material substrate is configured to form an aircraft fuselage assembly interior, or inner surface.

In another aspect, the co-curable composite material substrate comprises both an outer mold line and an inner mold line.

In another aspect, the co-curable composite material substrate is configured to form both an aircraft fuselage assembly exterior, or outer surface and an aircraft fuselage assembly interior, or inner surface.

According to another present aspect, a co-cured composite material fuselage assembly is disclosed, with the co-cured composite material fuselage assembly comprising a co-cured composite material substrate, with the co-cured composite material substrate comprising a co-cured composite material substrate first side and a co-cured composite material substrate second side. The co-cured composite material fuselage assembly further comprises a co-cured UV/visible light-resistant fiberglass layer, with the co-cured UV/visible light-resistant fiberglass layer comprising a co-cured UV/visible light-resistant fiberglass layer first side and a co-cured UV/visible light-resistant fiberglass layer second side, with the co-cured UV/visible light-resistant fiberglass layer first side in direct contact with the co-cured composite material substrate second side, and wherein the composite material substrate and the co-cured UV/visible light-resistant fiberglass layer are co-cured in a co-curing regimen to form a co-cured composite material fuselage assembly, with the co-curing regimen comprising a co-curing temperature ranging from about 250° F. to about 370° F., and wherein the co-cured UV/visible light-resistant fiberglass layer has a UV/visible light transmittance value of 0% to about 20% for UV/visible light wavelengths ranging from about 200 nm to about 800 nm when the co-cured UV/visible light-resistant fiberglass-containing layer comprises an average thickness ranging from about 2 mils to about 6 mils, and wherein the co-cured composite material (that can be, for example a co-curable epoxy resin-based composite material substrate and that can further be a carbon fiber reinforced polymer composite material, etc.) in combination with the co-cured UV/visible light-resistant fiberglass-containing layer is configured to form a co-cured composite material fuselage assembly.

In another aspect, the co-cured composite material substrate comprises a fiber reinforced resin matrix, said fiber reinforced resin matrix comprising at least one of carbon fibers, boron fibers, aramid fibers, fiberglass fibers, polyester fibers, and combinations thereof.

In another aspect, the inclusion of the UV/visible light-resistant fiberglass-containing layer in the co-cured composite material fuselage assembly obviates the presence of at least one of a detail primer layer and at least one spray surfacer when the composite material fuselage assembly further comprises a completed decorative livery covering the cured composite material fuselage assembly.

In a further aspect, the inclusion of the UV/visible light-resistant fiberglass-containing layer in the cured composite material assembly obviates the presence of at least one of a detail primer layer and a UV-absorbing paint layer in a final co-cured composite material assembly.

In another aspect, the co-cured composite material substrate comprises an outer mold line.

In another aspect, the co-cured composite material substrate is configured to form an aircraft fuselage assembly exterior, or outer surface.

In a further aspect, the co-cured composite material substrate comprises an inner mold line.

In another aspect, the co-cured composite material substrate is configured to form an aircraft fuselage assembly interior, or inner surface.

In another aspect, the co-cured composite material substrate comprises both an outer mold line and an inner mold line.

In another aspect, the co-cured composite material substrate is configured to form both an aircraft fuselage assembly exterior, or outer surface and an aircraft fuselage assembly interior, or inner surface.

In a further aspect, the co-cured composite material substrate comprises an outer mold line on a co-cured composite material first side and wherein the co-cured composite material substrate further comprises an inner mold line on a co-cured composite material second side.

In another aspect, a vehicle is disclosed with the vehicle comprising a co-cured composite material fuselage assembly is disclosed, with the co-cured composite material fuselage assembly further comprises a co-cured composite material substrate, with the co-cured composite material substrate comprising a co-cured composite material substrate first side and a co-cured composite material substrate second side. The co-cured composite material fuselage assembly further comprises a co-cured UV/visible light-resistant fiberglass layer, with the co-cured UV/visible light-resistant fiberglass layer comprising a co-cured UV/visible light-resistant fiberglass layer first side and a co-cured UV/visible light-resistant fiberglass layer second side, said co-cured UV/visible light-resistant fiberglass layer first side in direct contact with the co-cured composite material substrate second side, and wherein the composite material substrate and the co-cured UV/visible light-resistant fiberglass layer are co-cured in a co-curing regimen to form a cured composite material fuselage assembly, with the co-curing regimen comprising a co-curing temperature ranging from about 250° F. to about 370° F., and wherein the UV/visible light-resistant fiberglass layer has a UV/visible light transmittance value of 0% to about 20% for UV/visible light wavelengths ranging from about 200 nm to about 800 nm when the co-cured UV/visible light-resistant fiberglass-containing layer comprises an average thickness ranging from about 2 mils to about 6 mils, and wherein the co-cured composite material (that can be, for example a co-cured epoxy resin-based composite material substrate and can further be a co-cured carbon fiber reinforced polymer composite material, etc.) in combination with the co-cured UV/visible light-resistant fiberglass-containing layer is configured to form a co-cured composite material fuselage assembly.

In another aspect, the vehicle is selected from the group consisting of a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle; a crewed surface water borne vehicle, an uncrewed waterborne vehicle, a crewed sub-surface water borne vehicle, an uncrewed sub-surface water borne vehicle, a satellite, and combinations thereof.

In a further aspect, the vehicle is an aircraft.

According to a present aspect, a method for making a co-cured composite material aircraft fuselage is disclosed, with the method comprising providing a co-curable composite material substrate, with the co-curable composite material substrate comprising a co-curable composite material substrate first side and a co-curable composite material substrate second side, applying at least one co-curable UV/visible light-resistant fiberglass layer onto at least one of the co-curable composite material substrate first side and the co-curable composite material substrate second side, with the co-curable UV/visible light-resistant fiberglass layer having a UV/visible light transmittance value of 0% to about 20% for UV/visible light wavelengths ranging from about 200 nm to about 800 nm when the co-curable UV/visible light-resistant fiberglass-containing layer comprises an average thickness ranging from about 2 mils to about 6 mils, and co-curing the co-curable composite material substrate with the co-curable UV/visible light-resistant fiberglass-containing layer, and forming a co-cured composite material fuselage assembly for an aircraft structure.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
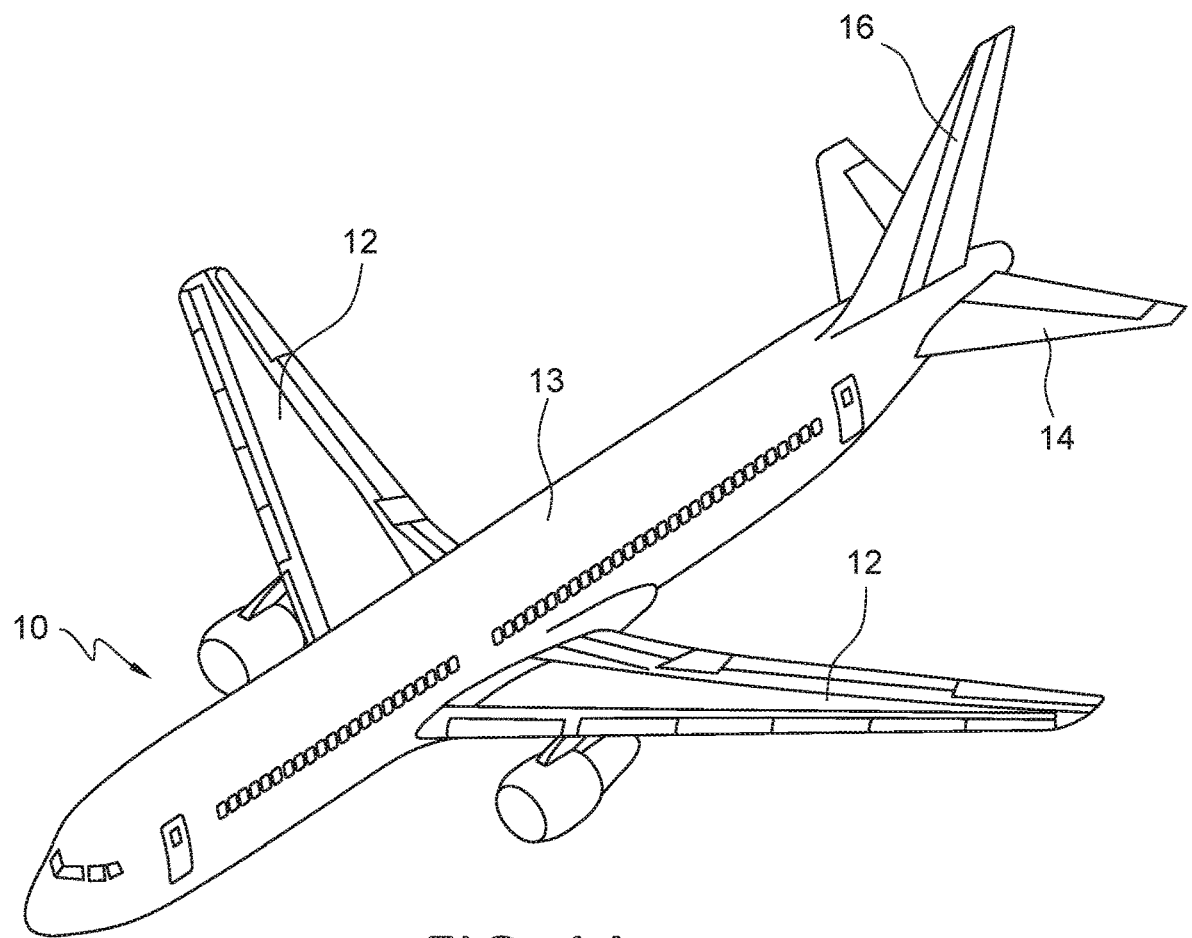
Figure 1B:
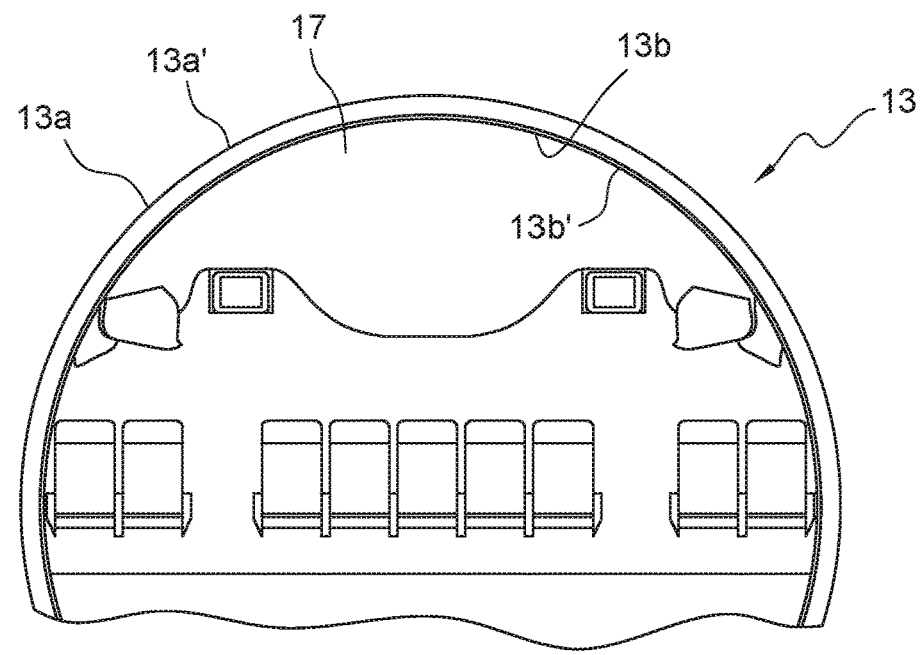
Figure 2A:
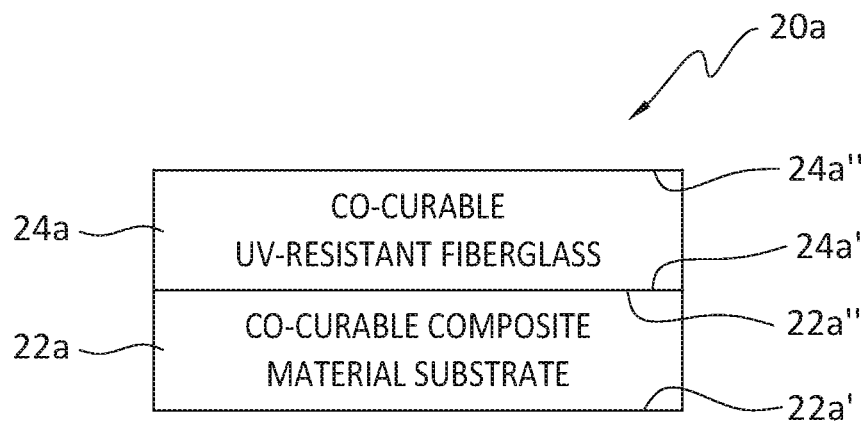
Figure 2B:
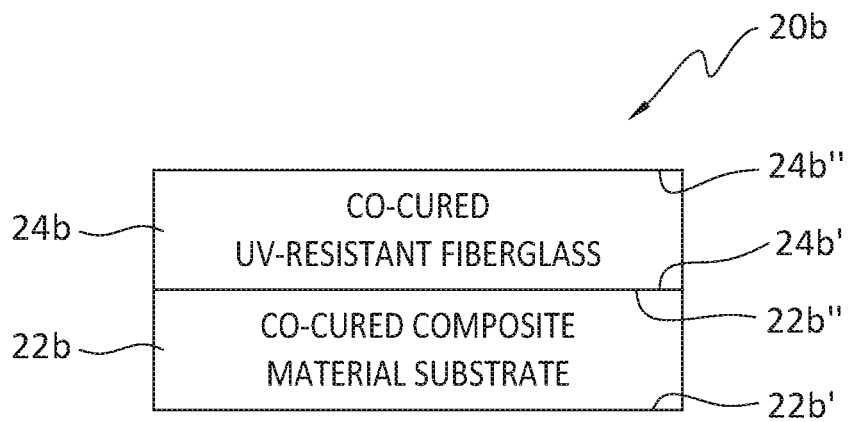
Figure 2C:
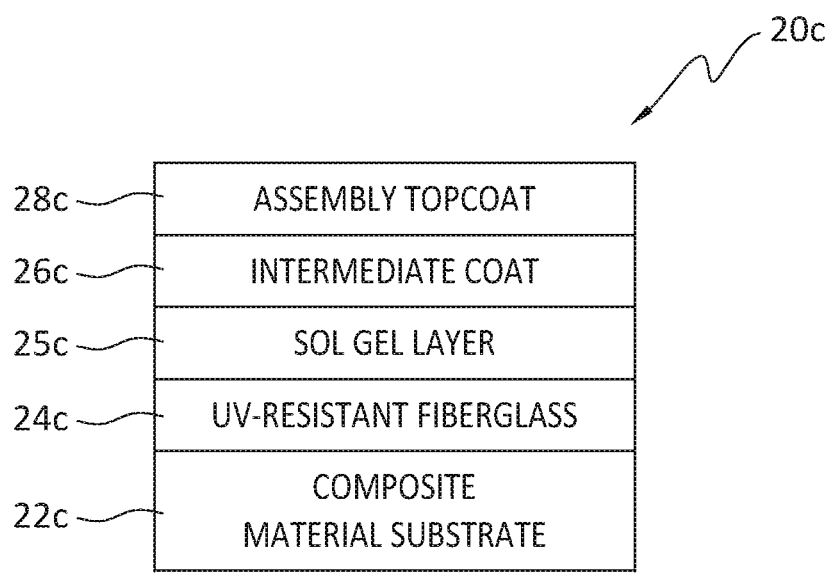
Figure 3:
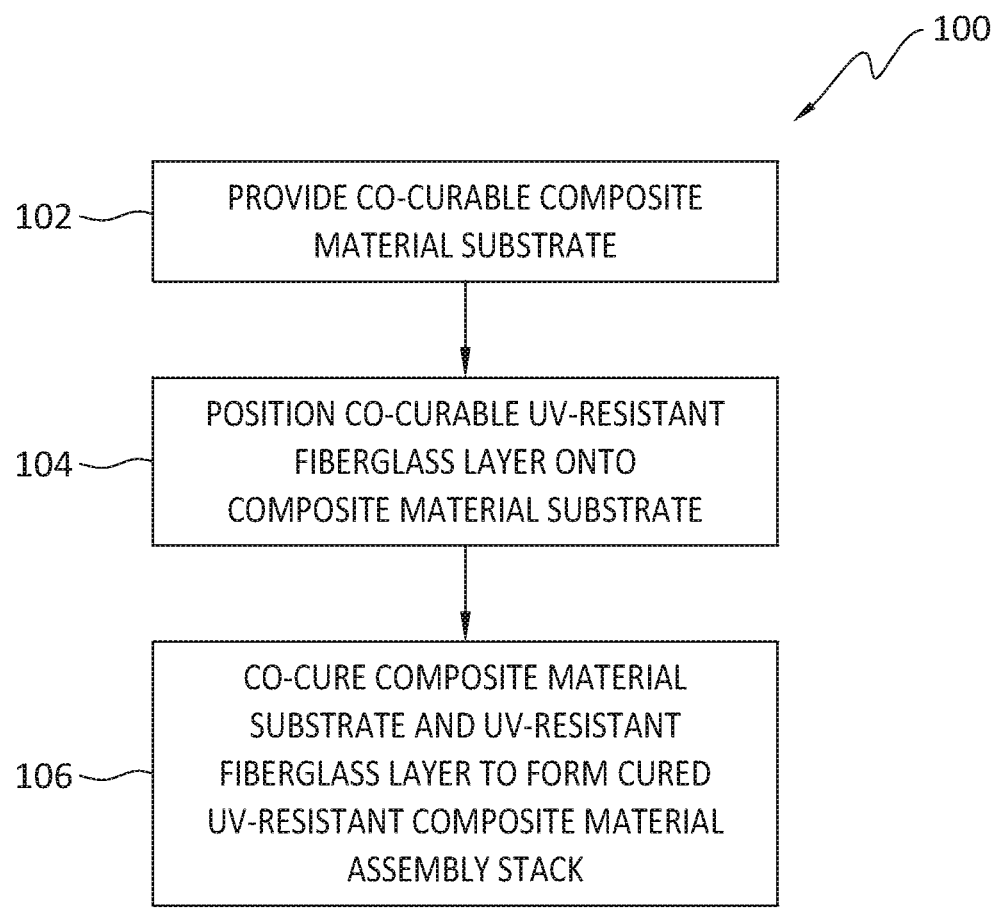

Having thus described aspects of the disclosure in general terms, reference is now made to the accompanying drawings, which are not necessarily drawn to scale, and wherein:

FIG. 1A is an illustration of a vehicle in the form of an aircraft, according to present aspects;

FIG. 1B is an illustration of a cross-sectional view into the vehicle in the form of an aircraft, and shown in FIG. 1A, according to present aspects;

FIG. 2A is an enlarged cross-sectional representative side view of a UV/visible light-resistant co-curable composite material, according to present aspects;

FIG. 2B is an enlarged cross-sectional representative side view of a UV/visible light-resistant co-cured composite material, according to present aspects FIG. 2C is an enlarged cross-sectional representative side view of a UV/visible light-resistant co-cured composite material stack, according to present aspects; and FIG. 3 is a flowchart outlining a method, according to present aspects.

DETAILED DESCRIPTION

Material layers that can be applied as, for example, coatings, can be added to a composite material surface for the purpose of changing the surface characteristics of a composite material. For example, primers or other coating layers can be added to a composite material to improve adhesion of subsequent coating layers such as, for example, paints, topcoats, etc., to a composite material surface that may already have one or more other coatings applied. The layering of coating materials onto composite material surfaces is labor intensive, time-consuming and can add substantial weight to large objects and large structures that include such composite materials having multiple coating layers.

In addition, paint removal processes that remove various paint coating layers from composite materials often damage protective surfacing layers applied to composite materials and layers that are applied beneath paint coating layers can require significant resurfacing once the paint layers are removed from the surfacing layers. For example, one or more of the composite material coating layers can each require separate surfacing preparation steps and procedures prior to the subsequent deposition of one or more coating layers onto composite material surfaces. In some instances, a portion of one or more previously deposited coating must be removed, or otherwise reworked, before adding further coating layers. Such intermediate reworking of composite material surfaces during the treatment of composite material surfaces is also labor-intensive, time-consuming, and costly.

During the fabrication of composite material parts that can include for example, composite material substrates that can include, for example, an epoxy resin-based composite material, a carbon fiber reinforced polymer material, etc., composite material surfaces can begin to degrade at the composite material surface due to exposure to ambient ultraviolet (UV)/visible light radiation. To avoid a change in a surface characteristic of a composite material that can be caused, at least in part, by composite material exposure to UV/visible light radiation, composite material surfaces are often protected with polymeric coverings or coated with at least one protective layer such as, for example, a spray applied surfacer, a primer layer, etc., with the protective layer containing, for example, a UV "blocking" agent.

Applying UV mitigation agents, (e.g., UV "blocking" agents) in UV blocking material layers to composite surfaces often adds manufacturing complexity in the form of, at least, increasing manufacturing time, increasing rework time, increasing overall production cost, etc., as such applied UV blocking material coverings typically are applied and/or are removed from the composite material or reactivated chemically or mechanically before additional composite material assembly processing is conducted. In addition, primer and surfacing film layers are often further treated to accommodate a subsequent paint layer or topcoat. This further treatment of individual subsequent layers added to a composite material (that can be a composite material "stack") again leads to increased manufacturing time, increased rework time, increased overall production cost, etc.

Composite materials are typically post-processed or "reworked", for example, to re-paint and/or resurface composite materials. For example, primers and paint coatings that include a UV mitigation, or a UV "blocking" agent can be applied to a composite material surface for the purpose of protecting a composite material surface from degradation and/or discoloration that can be caused, for example, by exposing the composite material to ultraviolet (UV)/visible light radiation during the use of the composite material as a construction material in the manufacture of, for example, a larger structure.

In addition, UV/visible light damage from UV/visible light wavelengths impacting coating layers used to coat composite materials and/or impacting underlying composite materials during aircraft manufacture and aircraft use can cause a composite material to require material rework. Exposure to UV/visible light radiation can alter a material's characteristic over time. For example, UV/visible light radiation can render a coating layer or composite material vulnerable to processing damage, such as, for example, when a layer or composite material is exposed to, for example, a mechanical paint removal technique. Material layer selection for large structures to guard against environmental damage, including UV/visible light damage, can result in a required application of an additional series of coating layers, with each such coating layer application resulting in a significant amount of time, expense, and resulting added weight to large structures including, for example, aircraft (where weight considerations can further impact fuel usage, cargo and passenger capacity, aircraft range, etc.).

Present aspects are directed to co-curable and co-cured composite materials comprising a co-curable or co-cured layer of UV/visible light-resistant fiberglass immediately contacting the composite material substrate. The incorporation into the co-curable and co-cured composite material substrate of the co-cured and co-curable UV/visible light-resistant fiberglass layer significantly impacts composite material manufacture and improves the performance of, and reduces the weight of the structural composite material by at least obviating the need to include the series of separate UV/visible light-resistant coatings formerly applied to composite material substrates, such as for the protection of composite materials from UV/visible light damage, and in the preparation of a composite material system used in structural assemblies for larger components, including interior and exterior surfaces of vehicles, including, for example, aircraft fuselages.

According to present aspects, methods for improving the UV/visible light protection and reducing UV/visible light degradation of composite material substrates and substrate surfaces are disclosed, as well as forming co-cured composite material substrates having improved UV/visible light protection without the previously required presence of typically applied protective coverings or layers of primers or separate layers of, for example, UV-absorbing paint, etc. In addition to preventing UV/visible light degradation of underlying composite material substrate surfaces, presently disclosed methods, systems, and apparatuses eliminate the need for protective coverings, protective primer layers, UV-absorbing paint layers, with the result being a reduction in a composite material stack complexity and overall composite material stack weight that further reduces composite material processing time. The significant reduction in or elimination of composite material UV/visible light degradation can further decrease the occurrence of or delay the frequency the need for composite material rework (required by such UV/visible light degradation).

According to present aspects, a "co-curable" material is defined as a material that can be co-cured with another material such that the two co-curable materials will co-cure when exposed to common curing conditions, such as those that can be imposed by a predetermined curing regimen (predetermined temperature, pressure, ramp up temperatures/rates, dwell periods, etc.) to form a "co-cured" composition.

FIG. 1A is an illustration of a vehicle in the form of an aircraft, according to present aspects. As shown in FIG. 1A, aircraft 10 includes wing assemblies 12, aircraft fuselage 13, horizontal stabilizer assemblies 14, and vertical stabilizer assembly 16, with the presently disclosed composite materials configured to form various vehicle and aircraft assemblies including those shown in FIG. 1A.

FIG. 1B shows an enlarged cross-sectional view into the interior of the aircraft 10. FIG. 1B further shows the aircraft fuselage 13 comprising an aircraft fuselage exterior 13a, with the aircraft fuselage exterior 13a comprising an outer mold line (OML). FIG. 1B further shows the aircraft fuselage 13 comprising an aircraft fuselage interior 13b, with the aircraft fuselage interior 13b comprising an inner mold line (IML).

According to present aspects, a co-curable composite material substrate is provided that can comprise a composite material that can be a co-curable epoxy resin-based composite material in combination with a fiber matrix that can include carbon fibers, boron fibers, fiberglass fibers, aramid fibers, polyester fibers, and combinations thereof, with carbon fibers being particularly preferred, and with a co-curable carbon fiber reinforced polymer being particularly preferred as the co-curable composite material substrate.

According to further presently disclosed aspects, a co-curable composite material for use in the manufacture of a composite material structure further includes a co-curable UV/visible light-resistant layer (equivalently referred to herein as a UV/visible light-inhibiting layer) with the co-curable UV/visible light-resistant layer provided in the form of a co-curable UV/visible light-resistant fiberglass layer that can be a single fiberglass ply layer. According to further present aspects, the co-curable UV/visible light-resistant fiberglass layer is provided to be intimate contact with the co-curable composite material substrate material, with the composite material substrate being co-curable with the co-curable UV/visible light-resistant fiberglass layer.

The composite material substrate, also referred to equivalently herein as the base layer, or the underlayer, or the composite material substrate layer, can be a co-curable composite material that can be an epoxy resin-based material, including fiber reinforced polymer composite materials that can have an epoxy resin-based matrix, and can include carbon fiber reinforced polymer composite materials. In present aspects, the co-curable composite material can be any suitable composite material that can be co-cured with a co-curable fiberglass-containing material at a temperature ranging from about 250° F. to about 370° F.

Composite materials are often layered into laminates that have a selected number of composite material layers, often called "prepregs". Prepregs can be "pre-impregnated" composite fibers where a matrix material, such as, for example, an epoxy resin-based material, is already present. The fibers often take the form of a weave and the matrix is used to bond them together and to other components during manufacture. The composite matrix material is typically partially cured to allow easy handling. Such composite matrix material may require cool or cold storage to prevent further partial curing, or complete curing, and such composite matrix material is referred to as B-Stage material. Consequently, B-Stage prepregs are stored in cooled areas, as ambient heat can accelerate complete polymerization. Prepregs also allow one to impregnate a bulk amount of fiber and then store the prepreg in a cooled area for an extended time until a later cure. Prepregs are typically formed on a flat workable surface. Stacks of prepreg plies are then formed onto and, if desired, can be shaped into a desired shape using shaping or forming tools, also called mandrels. Present aspects contemplate, but are not limited to, the use of laid up layers of composite material prepregs to form the co-curable and co-cured composite material substrate.

According to present aspects, a selected degree of UV/visible light resistance and UV/visible light protection is exclusively imparted to the composite material substrate by immediately contacting a co-curable composite material surface with a co-curable UV/visible light-resistant fiberglass layer that, after co-curing, forms a co-cured UV/visible light-resistant fiberglass-coated composite material. That is, according to present aspects, previously required UV/visible light-resistant primers, UV-blocking paints, etc., can be eliminated, and their presence is otherwise obviated, as the UV protection function within a UV/visible light-resistant composite material is exclusively provided to the composite material and is exclusively satisfied by the addition and placement of a co-curable UV/visible light-resistant fiberglass layer that is provided in immediate contact with the co-curable composite material substrate.

By co-curing the UV/visible light-resistant fiberglass layer with the composite material, advantages are imparted by the presently disclosed co-cured UV/visible light-resistant fiberglass layer at least to the underlying composite material substrate, as well as to the final assemblies incorporating the co-cured UV/visible light-resistant fiberglass-coated composite material substrate. According to present aspects, such imparted advantages include, without limitation, the UV/visible light protection of the composite material, and protection of composite material substrate from deleterious effects of mechanical paint removal techniques.

In addition, the robustness of the presently disclosed co-curable UV/visible light-resistant fiberglass layer that is co-cured onto, for example, a co-curable epoxy-based composite material substrate is selected to endure subsequent and repeated heat treatments that may be required during subsequent and repeated repainting or rework protocols. That is, unlike some currently required repainting or rework protocols, the presently described co-cured UV/visible light-resistant fiberglass layer need not be replaced, removed, or otherwise reapplied during reworking, paint stripping, repainting, repeated heat treatments, etc. Further, present aspects contemplate the removal or reconditioning, if desired, of only the layers coated atop the present co-cured UV/visible light-resistant fiberglass layer (e.g., topcoat layers, basecoat layers, clearcoat layers, intermediate coating layers, etc.).

Through the use of the presently disclosed co-cured UV/visible light-resistant fiberglass-coated composite material substrate, a significant number of procedural steps that have previously been required during re-painting or reworking a composite material substrate are obviated; resulting in a substantial reduction in resources including, for example, material cost for replacing UV/visible light-damaged layers, manpower hours previously required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.).

According to present aspects, FIG. 2A shows an enlarged cross-sectional representative side view of a co-curable composite material assembly 20a consisting of a co-curable composite material substrate 22a (having a co-curable composite material first side 22a' and a co-curable composite material second side 22a") with a co-curable UV/visible light-resistant fiberglass layer 24a (having a co-curable UV/visible light-resistant fiberglass layer first side 24a' and a co-curable UV/visible light-resistant fiberglass layer second side 24a") disposed onto the co-curable composite material 22a. According to present aspects the co-curable composite assembly 20a can be co-cured to form a co-cured composite material (as shown in FIGS. 2B, 2C). The co-curable composite material 20a can be subjected to a co-curing regimen where the co-curable UV/visible light-resistant fiberglass layer 24a disposed onto the co-curable composite material substrate 22a are co-cured at a curing temperature less than 400° F., and more preferably at a temperature ranging from about 250° F. to about 370° F. for a suitable duration to co-cure the two components to form a co-cured UV/visible light-resistant composite material. As shown in FIG. 2A, the co-curable composite material substrate 22a can be a co-curable carbon fiber reinforced polymer composite material substrate and can be a co-curable epoxy resin-based composite material substrate.

FIG. 2B shows a co-cured UV/visible light-resistant composite material 20b that is formed from co-curing the uncured and co-curable components shown in FIG. 2A. In the co-cured state as shown in FIG. 2B, a co-cured UV/visible light-resistant fiberglass layer 24b (having a co-cured UV/visible light-resistant fiberglass layer first side 24b' and a co-cured UV/visible light-resistant fiberglass layer second side 24b") that is co-cured with the co-cured composite material substrate 22b (having a co-cured composite material first side 22b' and a co-cured composite material second side 22b") forms the co-cured UV/visible light-resistant composite material assembly 20b. According to present aspects, the co-cured UV/visible light-resistant fiberglass layer 24b can be a single ply, or can be more than one ply, with the co-cured UV/visible light-resistant fiberglass layer 24b able to exclusively impart (i.e., is essentially 100% responsible for imparting) up to 100% of the selected degree of UV/visible light protection to the underlying co-cured composite material substrate 22b such that the co-cured UV/visible light-resistant fiberglass layer 24b has a UV/visible light transmittance value ranging from about 0% to about 20% UV transmittance for UV/visible light wavelengths ranging from about 200 nm to about 800 nm when the co-cured UV/visible light-resistant fiberglass-containing layer comprises an average thickness ranging from about 2 mils to about 6 mils.

According to present aspects, the UV/visible light-resistant fiberglass layer is selected to have a UV resistance characteristic and value such that the co-cured UV/visible light-resistant fiberglass layer alone is solely (e.g., 100%) responsible for imparting the degree of UV-resistance and UV/visible light protection to the underlying epoxy resin-based composite material. That is, according to present aspects, the UV blocking capabilities of the co-cured UV/visible light-resistant fiberglass layer eliminate the need for, render redundant, and otherwise obviate the presence of any additional UV/visible light-resistant layer in a composite material "stack" including, for example, UV/visible light-resistant paints, UV/visible light-resistant primers, UV/visible light-resistant topcoats, as well as obviating the need for incorporating UV-blocking agents into the containing material substrate. Instead, according to present aspects, the entire UV/visible light-blocking function for the presently disclosed co-cured composite material assemblies, and structures incorporating the presently disclosed co-cured composite material assemblies, are completely satisfied by and are otherwise provided to the composite material by, the UV/visible light-blocking capabilities introduced to the resulting cured composite material assembly by the UV/visible light-resistant fiberglass layer, that can be, for example, a single ply UV/visible light-resistant fiberglass layer. Again, no additional UV/visible light-resistant layers are needed to achieve the desired UV/visible light-blocking function for the presently disclosed co-cured composite material assemblies.

According to present aspects, the co-cured UV/visible light-resistant composite material assemblies of the type shown in FIG. 2B can be used as structural composite materials for the manufacture of structural components and structural component assemblies of vehicles, including, for example, an aircraft fuselage. Accordingly, when configured as various aircraft structural composite materials, the co-cured UV/visible light-resistant composite material assemblies 20b, including, for example, the type shown in FIG. 2B, can be configured to accept and otherwise facilitate the application of various primer and topcoat layers that will either become a part of, or precede the formation of an exterior of a large structural assembly such as, for example, an aircraft livery on an aircraft fuselage.

In addition, the co-cured UV/visible light-resistant composite material assembly 20b of the type shown in FIG. 2B can not only be used as structural composite materials for a fuselage exterior with the co-cured composite material assembly comprising an outer mold line (shown, for example in FIG. 1B as existing at aircraft fuselage exterior 13a), but the co-cured composite material assembly 20b of the type shown in FIG. 2B can also be used as structural composite materials for a fuselage interior with the co-cured composite material assembly comprising an inner mold line (shown, for example in FIG. 1B as existing at aircraft fuselage interior 13b). According to present aspects, such composite material versatility can allow the interior of a composite material fuselage to also be protected from exposure to harmful UV/visible light radiation. In presently contemplated configurations, a co-cured UV/visible light-resistant fiberglass layer coats and protects a segment of composite material substrate positioned at the interior of an aircraft fuselage such that both sides of a composite material substrate can comprise the co-cured UV/visible light-resistant fiberglass layer; protecting both sides of the co-cured composite material from deleterious effects of UV/visible light radiation exposure.

FIG. 2C is an enlarged cross-sectional representative side view of a co-cured UV/visible light-resistant composite material assembly 20c in the form of a composite material system (equivalently referred to herein as a composite material "stack") that further includes the co-cured UV/visible light-resistant composite material assembly layers shown in FIG. 2B (as assembly 20b). That is, FIG. 2C shows a co-cured composite material substrate 22c with the co-cured UV/visible light-resistant fiberglass layer 24c disposed onto the co-cured composite material substrate 22c. As further shown in FIG. 2C, and according to present aspects, the co-cured UV/visible light-resistant composite material assembly does not contain any further UV/visible light-resistant material (e.g., in the form of UV/visible light-resistant primer layer(s) or UV/visible light-resistant paint layer(s), etc.). That is, as shown in FIG. 2C, and according to present aspects, the UV/visible light-resistant fiberglass layer 24c is solely and exclusively responsible for imparting UV/visible light-resistance to the UV/visible light-resistant composite material assembly 20c (e.g., inhibiting UV/visible light radiation from passing through the co-cured UV/visible light-resistant fiberglass layer to the underlying co-cured composite material substrate).

The co-cured UV/visible light-resistant composite material assembly 20c as shown in FIG. 2C further comprises a sol gel 25c, an intermediate coat layer 26c and a topcoat layer 28c covering the co-cured UV/visible light-resistant fiberglass layer 24c. According to present aspects, in a co-cured composite material system useful for an aircraft fuselage, primer layer(s) are conspicuously absent and are otherwise rendered unnecessary—a departure from typical material systems used to coat composite materials used in the manufacture of aircraft fuselage assemblies. Such elimination of primer layer(s) results in a significant weight reduction, cost reduction, processing time reduction, rework time reduction, man/hour labor reduction, and required material reduction due to, for example, the scale of a large structure having large structure assemblies including, for example, aircraft fuselages.

According to present aspects, the co-cured UV/visible light-resistant fiberglass layer provides multifunctionality to a composite material system, with the benefits of a fiberglass layer and the benefits of a UV/visible light-resistant layer now intentionally incorporated into one multifunctional co-cured fiberglass layer that is also UV/visible light-resistant, and that affords any required UV/visible light protection to an underlying composite structural material substrate, while simplifying a composite material system preparation/fabrication for use as, for example, an aircraft fuselage assembly. As shown in FIGS. 2B and 2C, the co-cured composite material substrate 22b, 22c can be a co-cured carbon fiber reinforced polymer composite material substrate and can further be a co-cured epoxy resin-based composite material substrate.

In addition, the co-cured UV/visible light-resistant composite material assembly 20b of the type shown at least in FIG. 2B can not only be used as structural composite materials for a fuselage exterior with the co-cured composite material assembly comprising an outer mold line (shown, for example in FIG. 1B as existing at aircraft fuselage exterior 13a), but the composite material assembly 20b of the type shown in FIG. 2B can also be used as structural composite materials for a fuselage interior with the co-cured composite material assembly comprising an inner mold line (shown, for example in FIG. 1B as existing at aircraft fuselage interior 13b). According to present aspects, such composite material versatility can allow the interior of a composite material fuselage to also be protected from exposure to harmful UV/visible light radiation. In this contemplated configuration, a co-cured UV/visible light-resistant fiberglass layer coats and protects a segment of composite material substrate positioned in the interior of an aircraft fuselage such that both sides of a composite material substrate will comprise the co-cured UV/visible light-resistant fiberglass layer; protecting both sides of the co-cured composite material from deleterious effects of UV/visible light radiation exposure.

FIG. 3 is a flowchart outlining methods for making the presently disclosed co-curable and co-cured composite materials. Further present aspects contemplate co-curable composite materials and co-cured composite materials, assemblies comprising the co-cured composite materials, sub-assemblies comprising the co-cured composite materials, and structures comprising at least one of the assemblies and/or sub-assemblies comprising the co-cured UV/visible light-resistant composite materials that are made according to the methods set forth herein, including, for example, crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed waterborne vehicle, a crewed sub-surface water borne vehicle, an uncrewed sub-surface water borne vehicle, a satellite, and combinations thereof.

As shown in FIG. 3, method 100 is outlined, with method 100 comprising providing 102 a co-curable composite material substrate that can be a co-curable carbon fiber reinforced polymer material substrate, and can further be a co-curable epoxy resin-based fiber reinforced composite material substrate. Method 100 further comprises positioning 104 a co-curable UV/visible light-resistant fiberglass layer onto the co-curable composite material substrate. According to present aspects, the co-curable UV/visible light-resistant fiberglass layer preferably can be a single ply, or a plurality of plies, such that the co-curable UV/visible light-resistant fiberglass layer has a UV/visible light transmittance value ranging from about 0% to about 20% UV/visible light transmittance for UV/visible light wavelengths ranging from about 200 nm to about 800 nm when the UV/visible light-resistant fiberglass-containing layer comprises an average thickness ranging from about 2 mils to about 6 mils. The co-curable UV/visible light-resistant composite material assembly comprising the UV/visible light-resistant fiberglass-containing layer can be of the type shown and described at least in FIG. 2A and as described herein. Method 100 further comprises co-curing 106 the co-curable composite material substrate with the co-curable UV/visible light-resistant fiberglass-containing layer at a temperature ranging from about 250° F. to about 370° F. to form a co-cured UV/visible light-resistant composite material assembly of the type shown and described at least in FIGS. 2B and 2C, and as described herein.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A co-curable composite material fuselage assembly consisting of:
   a co-curable composite material assembly comprising:
      a co-curable composite material substrate, said co-curable composite material substrate comprising a co-curable composite material substrate first side and a co-curable composite material substrate second side;
      a co-curable UV/visible light-resistant fiberglass layer, said co-curable UV/visible light-resistant fiberglass layer comprising a co-curable UV/visible light-resistant fiberglass layer first side and a co-curable UV/visible light-resistant fiberglass layer second side, only said co-curable UV/visible light-resistant fiberglass layer configured to be in immediate contact with at least one of the co-curable composite material substrate first side and the co-cured composite material substrate second side, said co-curable UV/visible light-resistant fiberglass layer consisting of a single ply layer co-curable UV/visible light-resistant fiberglass layer, said co-curable UV/visible light-resistant fiberglass layer exclusively imparting 100% of a degree of UV/visible light protection imparted to the co-curable composite material substrate by the co-curable UV/visible light-resistant fiberglass layer;
   wherein the co-curable UV/visible light-resistant fiberglass layer has a UV/visible light transmittance value of 0% to about 20% for UV/visible light wavelengths ranging from about 200 nm to about 800 nm when the co-curable UV/visible light-resistant fiberglass layer comprises an average thickness ranging from about 2 mils to about 6 mils;
   wherein the co-curable composite material substrate in combination with the co-curable UV/visible light-resistant fiberglass layer is configured to form the co-curable composite material fuselage assembly;
   wherein the co-curable composite material substrate is co-curable with the co-curable UV/visible light-resistant fiberglass layer at a temperature ranging from about 250° F. to about 370° F.;
   wherein the co-curable composite material substrate second side is in direct contact with the co-curable UV/visible light-resistant fiberglass layer first side;
   wherein the co-curable UV/visible light-resistant fiberglass layer completely covers the co-curable composite material substrate second side; and
   wherein the co-curable composite material substrate assembly does not contain an additional UV/visible light-resistant layer.

2. The co-curable composite material fuselage assembly of claim 1, wherein the co-curable composite material substrate comprises a fiber reinforced epoxy resin matrix.

3. The co-curable composite material fuselage assembly of claim 2, wherein the fiber reinforced epoxy resin matrix comprises at least one of carbon fibers, boron fibers, aramid fibers, fiberglass fibers, polyester fibers, and combinations thereof.

4. The co-curable composite material fuselage assembly of claim 1, wherein the co-curable composite material substrate comprises a carbon fiber reinforced polymer.

5. The co-curable composite material fuselage assembly of claim 1, wherein the co-curable composite material substrate comprises a plurality of carbon fiber reinforced polymer prepregs.

6. The co-curable composite material fuselage assembly of claim 1, wherein the co-curable composite material assembly comprises an outer mold line.

7. The co-curable composite material fuselage assembly of claim 1, wherein the co-curable composite material assembly comprises an inner mold line.

8. The co-curable composite material fuselage assembly of claim 1, wherein the co-curable composite material assembly comprises both an outer mold line and an inner mold line.

9. The co-curable composite material fuselage assembly of claim 1, wherein the co-curable composite material substrate comprises a fiber reinforced resin matrix, said fiber reinforced resin matrix comprising at least one of carbon fibers, boron fibers, aramid fibers, fiberglass fibers, polyester fibers, and combinations thereof.

10. The co-curable composite material fuselage assembly of claim 1, wherein the co-curable composite material fuselage assembly is configured to form a co-curable fuselage exterior.

11. The co-curable composite material fuselage assembly of claim 1, wherein the co-curable composite material fuselage assembly is configured to form a co-curable fuselage interior.

12. The co-curable composite material fuselage assembly of claim 1, wherein the co-curable composite material substrate comprises at least one of an outer mold line and an inner mold line.

13. A method for making a co-curable composite material fuselage assembly, the method comprising:
   providing a co-curable composite material substrate, said co-curable composite material substrate comprising a co-curable composite material substrate first side and a co-curable composite material substrate second side;
   providing a co-curable UV/visible light-resistant fiberglass layer, said co-curable UV/visible light-resistant fiberglass layer comprising a co-curable UV/visible light-resistant fiberglass layer first side and a co-curable UV/visible light-resistant fiberglass layer second side, only said co-curable UV/visible light-resistant fiberglass layer configured to be in immediate contact with at least one of the co-curable composite material substrate first side and the co-cured composite material substrate second side, said co-curable UV/visible light-resistant fiberglass layer consisting of a single ply layer co-curable UV/visible light-resistant fiberglass layer, said co-curable UV/visible light-resistant fiberglass layer exclusively imparting 100% of a degree of UV/visible light protection imparted to the co-curable composite material substrate by the co-curable UV/visible light-resistant fiberglass layer;

applying the co-curable UV/visible light-resistant fiberglass layer onto and in intimate contact with at least one of said co-curable composite material substrate first side and the co-curable composite material substrate second side, said co-curable UV/visible light-resistant fiberglass layer having a UV/visible light transmittance value of 0% to about 20% for UV/visible light wavelengths ranging from about 200 nm to about 800 nm when the co-curable UV/visible light-resistant fiberglass layer comprises an average thickness ranging from about 2 mils to about 6 mils, said co-curable UV/visible light-resistant co-curable fiberglass layer exclusively imparting 100% of a degree of UV/visible light protection imparted to the co-curable composite material substrate by the co-curable UV/visible light-resistant fiberglass layer, said co-curable UV/visible light-resistant fiberglass layer consisting of a single ply UV/visible light-resistant fiberglass layer;

co-curing the co-curable composite substrate material substrate with the co-curable UV/visible light-resistant fiberglass-containing fiberglass layer at a temperature ranging from about 250° F. to about 370° F. to form a co-cured composite material fuselage assembly for an aircraft;

wherein the co-curable UV/visible light-resistant fiberglass layer alone is configured to be solely responsible for UV/visible light-resistance imparted to the co-curable composite material fuselage assembly;

wherein the co-curable composite material substrate second side is in direct contact with the co-curable UV/visible light-resistant fiberglass layer first side;

wherein the co-curable UV/visible light-resistant fiberglass layer completely covers the co-curable composite material substrate second side; and wherein the co-curable composite material substrate assembly does not contain an additional UV/visible light-resistant layer.

14. The method of claim 13, wherein said co-curable composite material fuselage assembly is configured to form a co-curable aircraft fuselage exterior.

15. The method of claim 13, wherein said co-curable composite material fuselage assembly is configured to form a co-curable aircraft fuselage interior.

* * * * *